(12) United States Patent
Chen (10) Patent No.: US 11,880,092 B2
(45) Date of Patent: Jan. 23, 2024

(54) GLASSES WITH VENTILATIVE STRUCTURE

(71) Applicant: ARGUS VISION INTERNATIONAL LIMITED, Tainan (TW)

(72) Inventor: Lin Yun Chen, Tainan (TW)

(73) Assignee: ARGUS VISION INTERNATIONAL LIMITED, Tainan (TW)

(*) Notice: Subject to any disclaimer, the term of this patent is extended or adjusted under 35 U.S.C. 154(b) by 369 days.

(21) Appl. No.: 17/033,896

(22) Filed: Sep. 27, 2020

(65) Prior Publication Data
US 2021/0278697 A1 Sep. 9, 2021

(30) Foreign Application Priority Data

Mar. 4, 2020 (TW) .................................. 109107009

(51) Int. Cl.
*G02C 5/04* (2006.01)
*G02C 11/08* (2006.01)

(52) U.S. Cl.
CPC ................ *G02C 5/04* (2013.01); *G02C 11/08* (2013.01); *G02C 2200/18* (2013.01)

(58) Field of Classification Search
CPC ...... G02C 5/04; G02C 11/08; G02C 2200/18; G02C 2200/08; G02C 9/00; G02C 9/02;
(Continued)

(56) References Cited

U.S. PATENT DOCUMENTS

| 5,638,145 A | * | 6/1997 | Jannard | .................. | G02C 11/08 |
| | | | | | 2/435 |
| 6,783,235 B1 | * | 8/2004 | Lin | .................. | A61F 9/028 |
| | | | | | 2/435 |
| 7,591,555 B1 | * | 9/2009 | Chen | .................. | G02C 5/122 |
| | | | | | 351/137 |

(Continued)

FOREIGN PATENT DOCUMENTS

| CA | 2724672 A1 | * | 1/2010 | ............... G02C 1/06 |
| CN | 103238100 A | * | 8/2013 | ............... G02C 1/08 |

(Continued)

OTHER PUBLICATIONS

"Shield, Oxford English Dictionary, 2022, Oxford University Press, 1a" https://www.oed.com/view/Entry/178069?rskey=MXNShQ&result=2&isAdvanced=false#eid (Year: 2022).*

*Primary Examiner* — Zachary W Wilkes
*Assistant Examiner* — Sean McDowell
(74) *Attorney, Agent, or Firm* — Joseph A. Bruce; Bruce Stone LLP (57) ABSTRACT

Provided is a pair of glasses with a ventilated structure, mainly including an upper frame, a lens unit and a lower frame. The upper frame is provided with a lens groove and an inserting seat. The lens unit is arrange in the lens groove, and is provided with a plurality of air-permeable holes at the upper end of the lens unit. The lower frame is provided with an inserting section to be inserted into the inserting groove. The inserting section is provided with a positioning convex part operatively embedded in one of the adjusting holes of the adjusting unit to for a positioning. By positioning the position of the positioning convex part relative to each adjusting hole, the air-permeable holes of the lens are hidden or exposed on the upper frame.

7 Claims, 11 Drawing Sheets

(58) Field of Classification Search
CPC ............ G02C 9/04; G02C 5/146; G02C 5/16;
G02C 1/10; G02C 5/2209; G02C 5/22
See application file for complete search history.

(56) References Cited

U.S. PATENT DOCUMENTS

| | | | | |
|---|---|---|---|---|
| 10,345,616 | B2* | 7/2019 | Chou | G02C 1/08 |
| 2005/0270480 | A1* | 12/2005 | Curci | G02C 5/126 |
| | | | | 351/111 |
| 2007/0159591 | A1* | 7/2007 | Tu | G02C 11/08 |
| | | | | 351/41 |
| 2008/0129951 | A1* | 6/2008 | Matera | G02C 11/08 |
| | | | | 351/62 |
| 2011/0001921 | A1* | 1/2011 | Matera | G02C 11/08 |
| | | | | 351/62 |
| 2013/0293829 | A1* | 11/2013 | Chen | G02C 5/22 |
| | | | | 351/133 |
| 2014/0340627 | A1* | 11/2014 | Li | G02C 5/04 |
| | | | | 351/57 |
| 2017/0108708 | A1* | 4/2017 | Lin | G02C 1/08 |
| 2017/0219843 | A1* | 8/2017 | Albouy | G02C 5/14 |
| 2017/0322427 | A1* | 11/2017 | Chen | G02C 5/122 |
| 2017/0336649 | A1* | 11/2017 | Chen | G02C 1/08 |
| 2017/0336650 | A1* | 11/2017 | Chen | G02C 1/08 |
| 2017/0357104 | A1* | 12/2017 | Chen | G02C 5/146 |

FOREIGN PATENT DOCUMENTS

| | | | | |
|---|---|---|---|---|
| EP | 3702829 | A1 * | 9/2020 | ............ G02C 5/22 |
| GB | 2491210 | A * | 11/2012 | ............... G02C 1/08 |
| GB | 2573359 | A * | 11/2019 | ............... G02C 1/02 |
| WO | WO-9429763 | A1 * | 12/1994 | ........... G02C 5/2209 |

* cited by examiner

GLASSES WITH VENTILATIVE STRUCTURE

BACKGROUND OF THE INVENTION

1. Field of the Invention

The present disclosure relates to the structure of spectacles, and more particularly to a structure capable of opening and closing the ventilation holes/air-permeable holes of the lens.

2. The Prior Arts

With the advancement of technology and the continuous improvement of the quality of life, glasses of different materials and uses are produced accordingly. In addition to glasses for correcting vision, they can also block strong light, filter blue light, ultraviolet light and protect eyes, such as sunglasses or sports glasses.

The frame of sports glasses or windproof glasses fits the wearer's face better. Therefore, when doing outdoor sports, heat generated by the skin of the face and the wearer's sweat will cause the inner surface of the lens to be covered with moisture, which will affect the clarity of the wearer's vision. When moisture adheres to the inside of the lens, it cannot be wiped directly from the outside. Glasses must be removed to wipe the moisture inside the lens such that the wearer's activity is stopped.

Given the forgoing, the existing glasses are provided with a plurality of vents on the upper or lower edge of the frame such that the heat generated by the wearer's facial skin can be dissipated from the vents to prevent the heat from accumulating inside the glasses. However, when the glasses with vents are used in a windy and sandy environment, the vents cannot be closed, and dust may still enter the space inside the glasses through the vents along with the airflow of the strong wind, thereby causing damage to the glasses. As such, the prior art technology is still not perfect.

SUMMARY OF THE INVENTION

In light of the foregoing problems, the main objective of the present disclosure is to provide a pair of glasses with a ventilated structure, with a side facing a wearer's face as a rear side and a side facing an outside as a front side. The pair of glasses includes an upper frame, a lens unit and a lower frame.

The upper frame is provided with a pivot seat on each of two sides thereof. An inserting seat is provided between pivot seats. The inserting seat is provided with an inserting groove with a downward notch. One sidewall of the inserting seat is provided with an adjusting unit. The adjusting unit is at least provided with a first adjusting hole, a first channel and a second adjusting hole from top to bottom. The first adjusting hole, the first channel and the second adjusting hole are connected to each other, and communicate with the inserting seat. A width of the first channel is smaller than widths of the first adjusting hole and the second adjusting hole, and the upper frame further includes a first lens groove and a combination hole with an opening adjacent to the pivot seat to communicate with the first lens groove.

An upper end of the lens unit is connected to the first lens groove of the upper frame, and is provided with a plurality of spaced air-permeable holes.

The lower frame is provided with a joint section on each of two sides thereof, wherein the joint section enters the combination hole through the opening, and is coupled with the combination hole such that the two sides of the lower frame are operatively coupled or disassembled with respect to the upper frame. The lower frame includes an inserting section between joint sections to be embedded in the inserting groove, and the inserting section is further provided with a positioning convex part operatively embedded in the first adjust hole or the second adjusting hole of the adjusting unit to form a positioning As such, when the positioning convex part of the lower frame is embedded in the first adjusting hole, the plurality of air-permeable holes of the lens unit are received in the first lens groove and are shielded by the upper frame; when the positioning convex part of the inserting section elastically passes through the first channel with its material, and is inserted into the second adjusting hole, the combination hole of the upper frame is displaced relative to the lower frame such that the plurality of air-permeable holes of the lens unit are partially exposed outside the upper frame.

DETAILED DESCRIPTION OF THE PREFERRED EMBODIMENT

The detailed description of the present invention is provided in combination with the accompanying drawings.

Please refer to FIGS. 1-5. According to a preferred embodiment of the present disclosure, provided is a pair of glasses with a ventilated/ventilative structure, with a side facing a wearer's face as a rear side and a side facing an outside as a front side. The pair of glasses mainly includes an upper frame 2, a lens unit 3 and a lower frame 4.

The upper frame 2 is provided with a pivot seat 21 on each side thereof along the length direction. The pivot seat 21 is pivotally connected to a temple 5. An inserting seat 22 is further provided between the pivot seats 21, and is provided with an inserting groove 222 with a notch 221 downward. The inserting seat 22 is provided with an adjusting unit 23 facing the rear side wall of the upper frame 2. The adjusting unit 23 is at least provided with a first adjusting hole 231, a first channel 232, a second adjusting hole 233, a second channel 234 and a third adjusting hole 235 from top to bottom, and they are connected to each other. The first adjusting hole 231, the first channel 232, the second adjusting hole 233, the second channel 234 and the third adjusting hole 235 pass though the read side wall of the upper frame 2, and communicate with the inserting seat The upper frame 2 further includes a first lens groove 24. The rear side of the upper frame 2 is provided with a combination hole 25 having an opening on its rear side adjacent to the pivot seat 21. The combination 25 communicates with the first lens groove 24. The first lens groove 24 is provided with an accommodating space 241 corresponding to each of the combination holes 25. Each of the openings 251 extends from each of the combination holes 25 to the periphery of the upper frame 2. The width W1 of the opening 251 is smaller than the diameter D1 of the combination hole 25. The inserting seat 22 extends downward from the upper frame 2, and is on the rear side of the first lens groove 24. According to the embodiment of the present disclosure, the adjusting unit 23 has two side-by-side first adjusting holes 231, first channels 232, second adjusting holes 233, second channels 234 and third adjusting holes 235, as shown in the drawings, but not limited to the number of adjusting holes and channels. It is worth noting that the distance between the first adjusting hole 231 and the second adjusting hole 232 and the distance between the second adjusting hole 232 and the third adjusting hole 233 can be equal or unequal.

Figure 11:
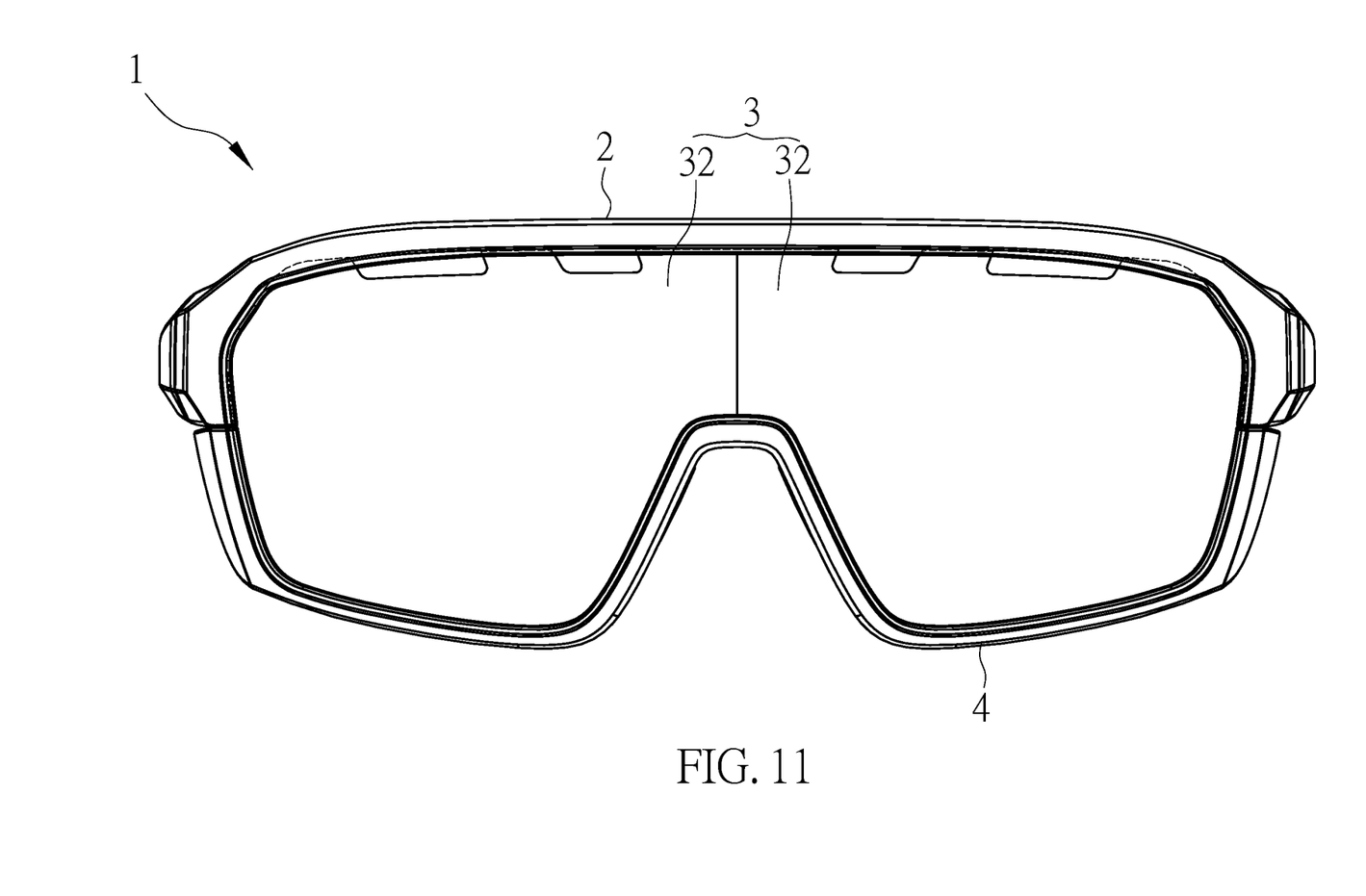
FIG. 11 is a schematic front view of the embodiment of the present disclosure.

The lens unit 3 may be a corrective lens or a sunshade or protective lens. The upper end of the lens unit 3 is combined with the first lens groove 24 of the upper frame 2. The upper end of the lens unit 3 is provided with a plurality of spaced air-permeable holes 31. In the embodiment of the present disclosure, the lens unit 3 is a one-piece lens, but not limited thereto. The lens unit 3 can also be a two-piece lens 32, as shown in FIG. 11.

Figure 1:
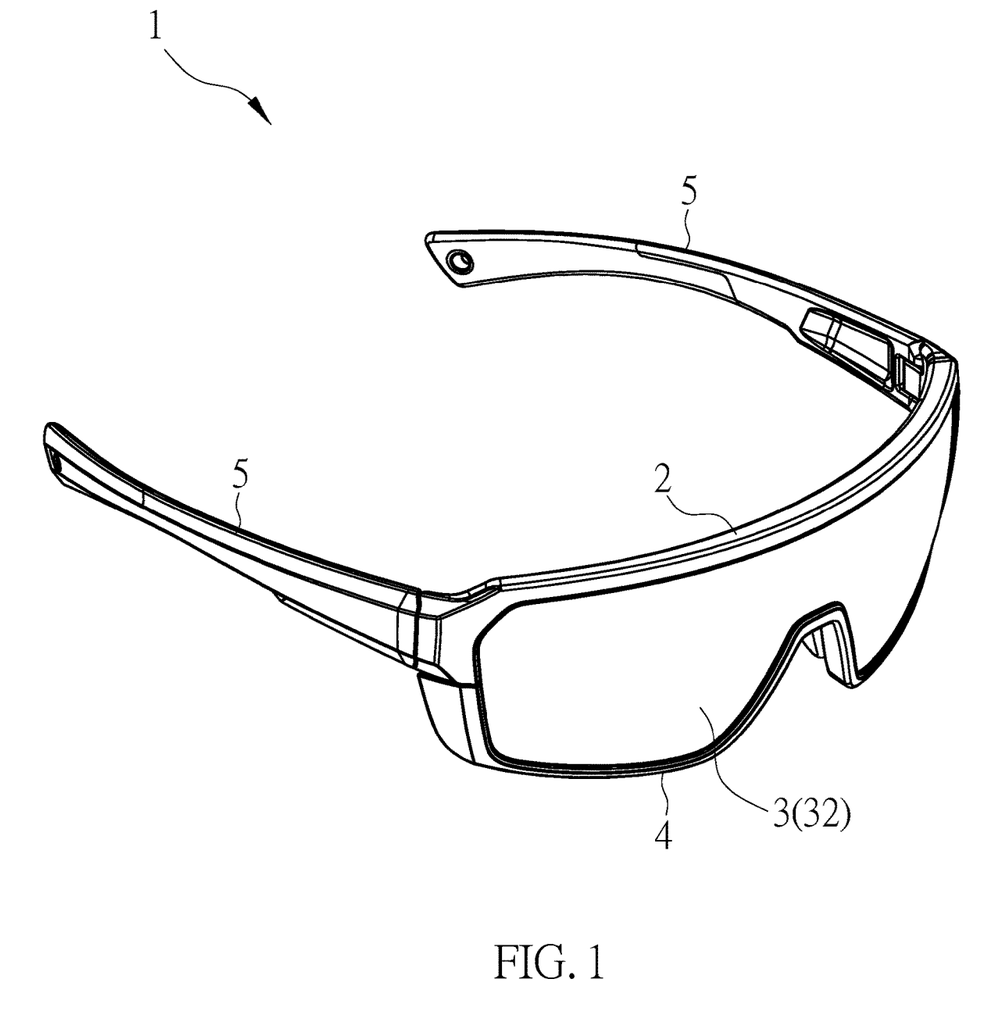
FIG. 1 is a three-dimensional schematic diagram of the present disclosure.
Figure 2:
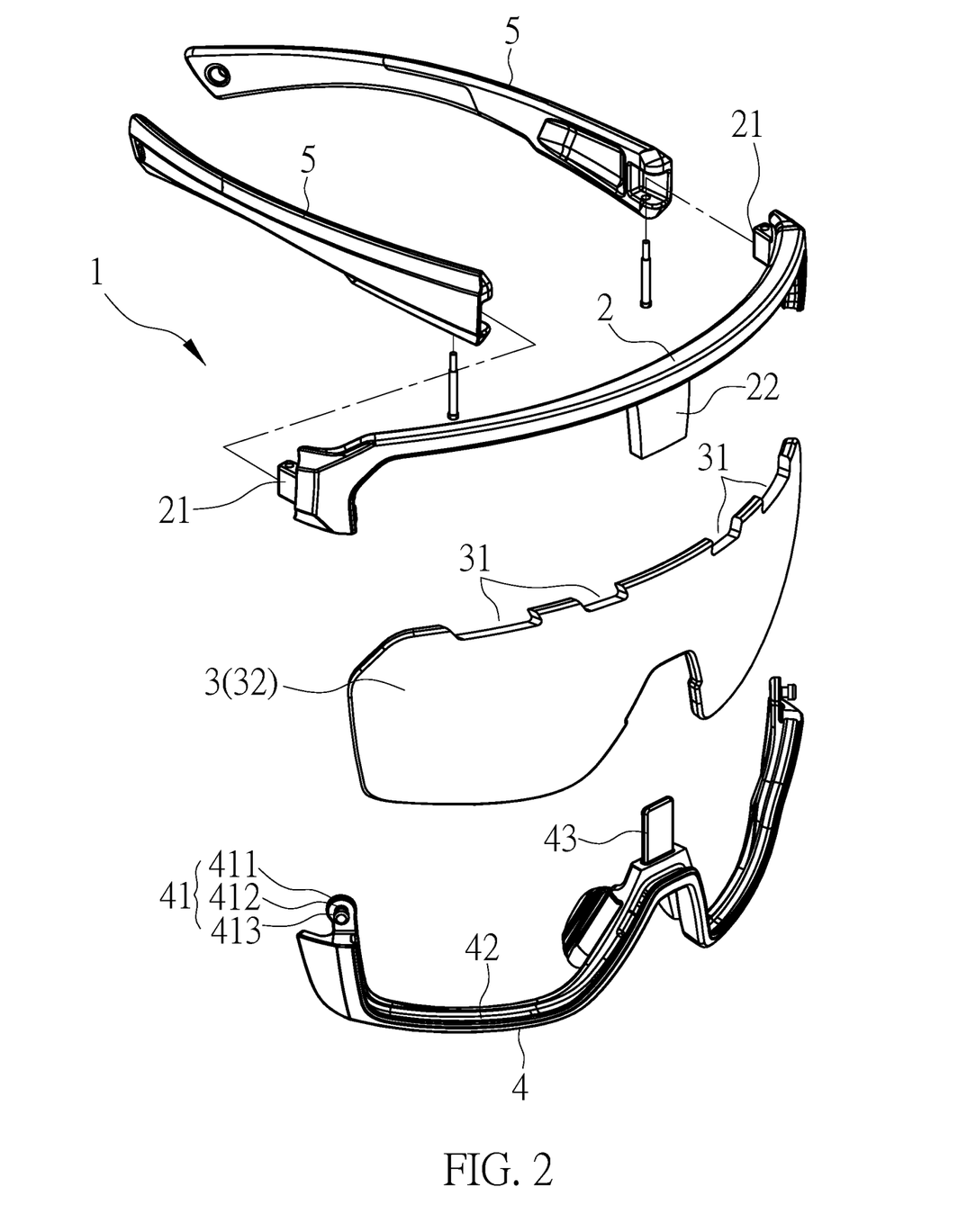
FIG. 2 is an exploded three-dimensional schematic diagram of the present disclosure.
Figure 3:
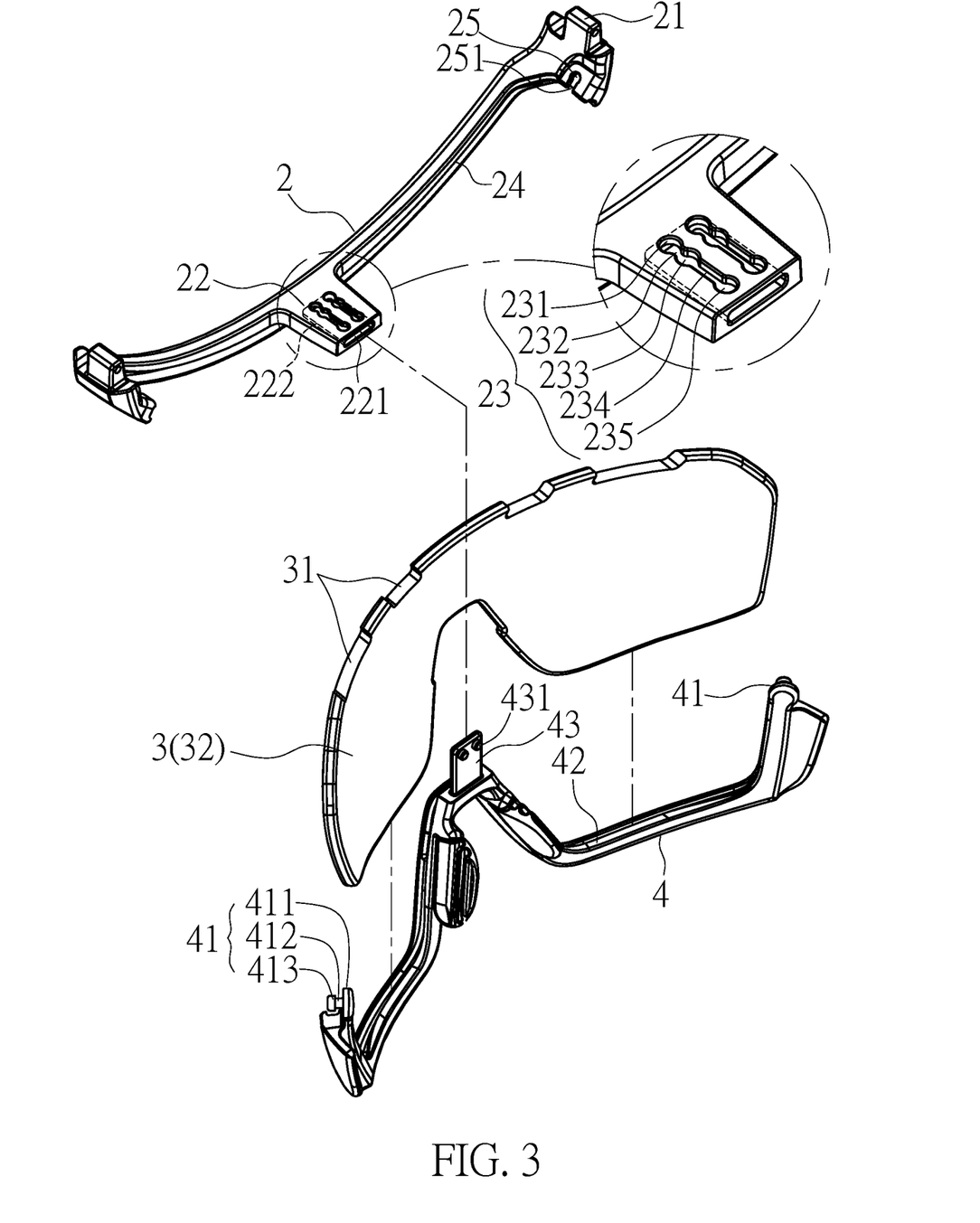
FIG. 3 is a partial exploded three-dimensional schematic diagram of the present disclosure.
Figure 4:
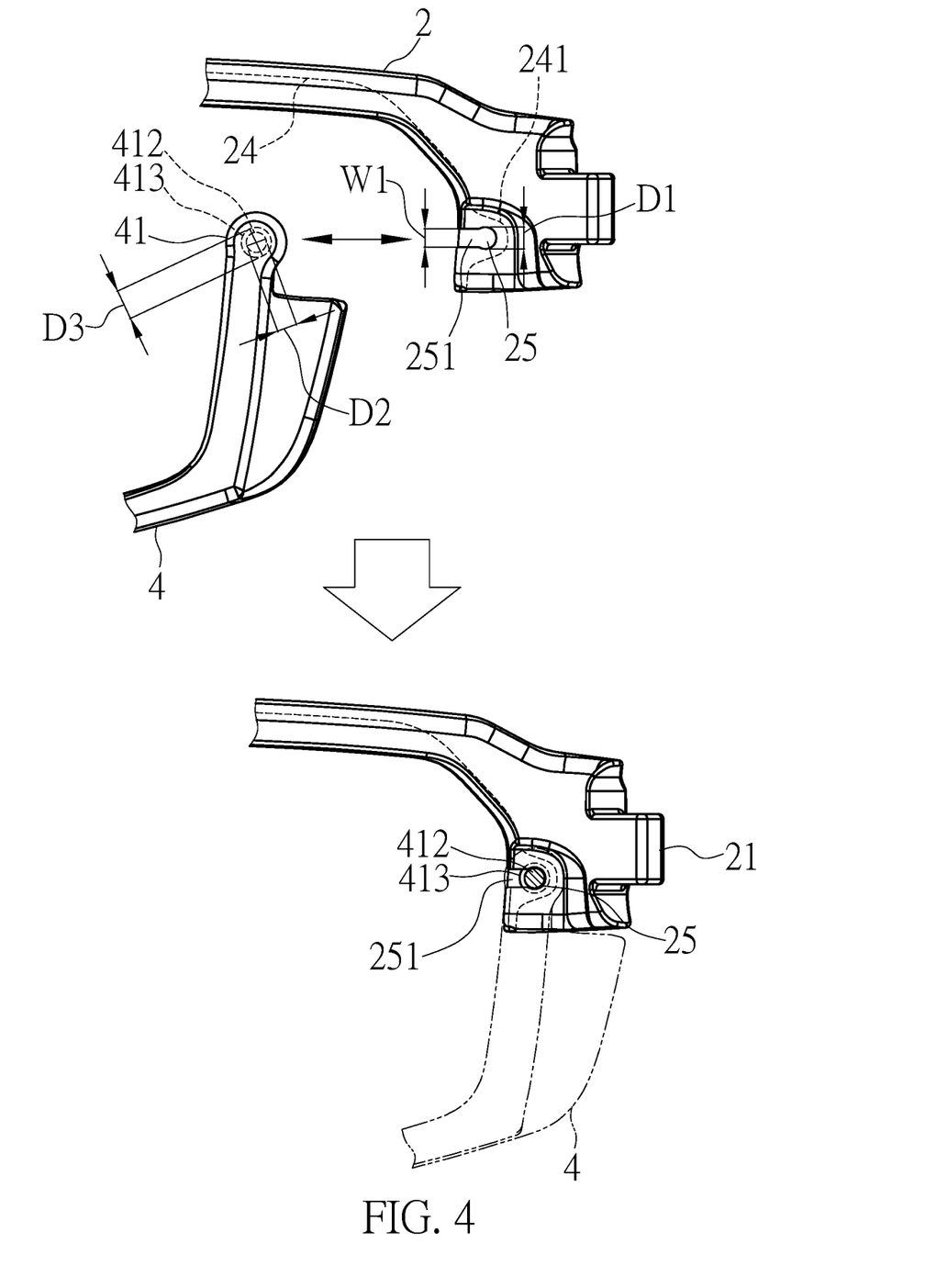
FIG. 4 is a schematic diagram showing the lower frame combined with the upper frame according to the embodiment of the present disclosure.
Figure 5:
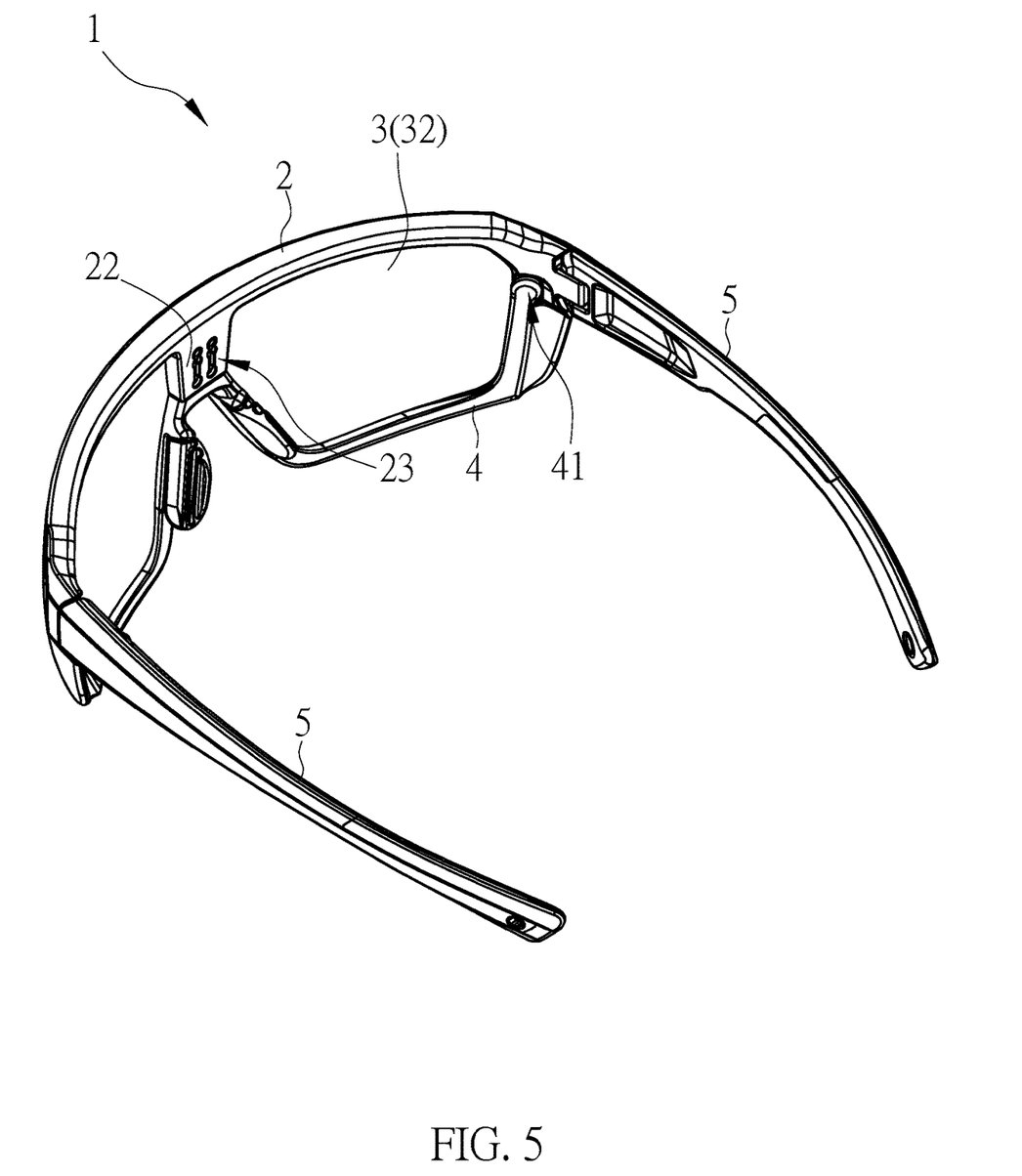
FIG. 5 is a three-dimensional schematic diagram of the present disclosure.
Figure 6:
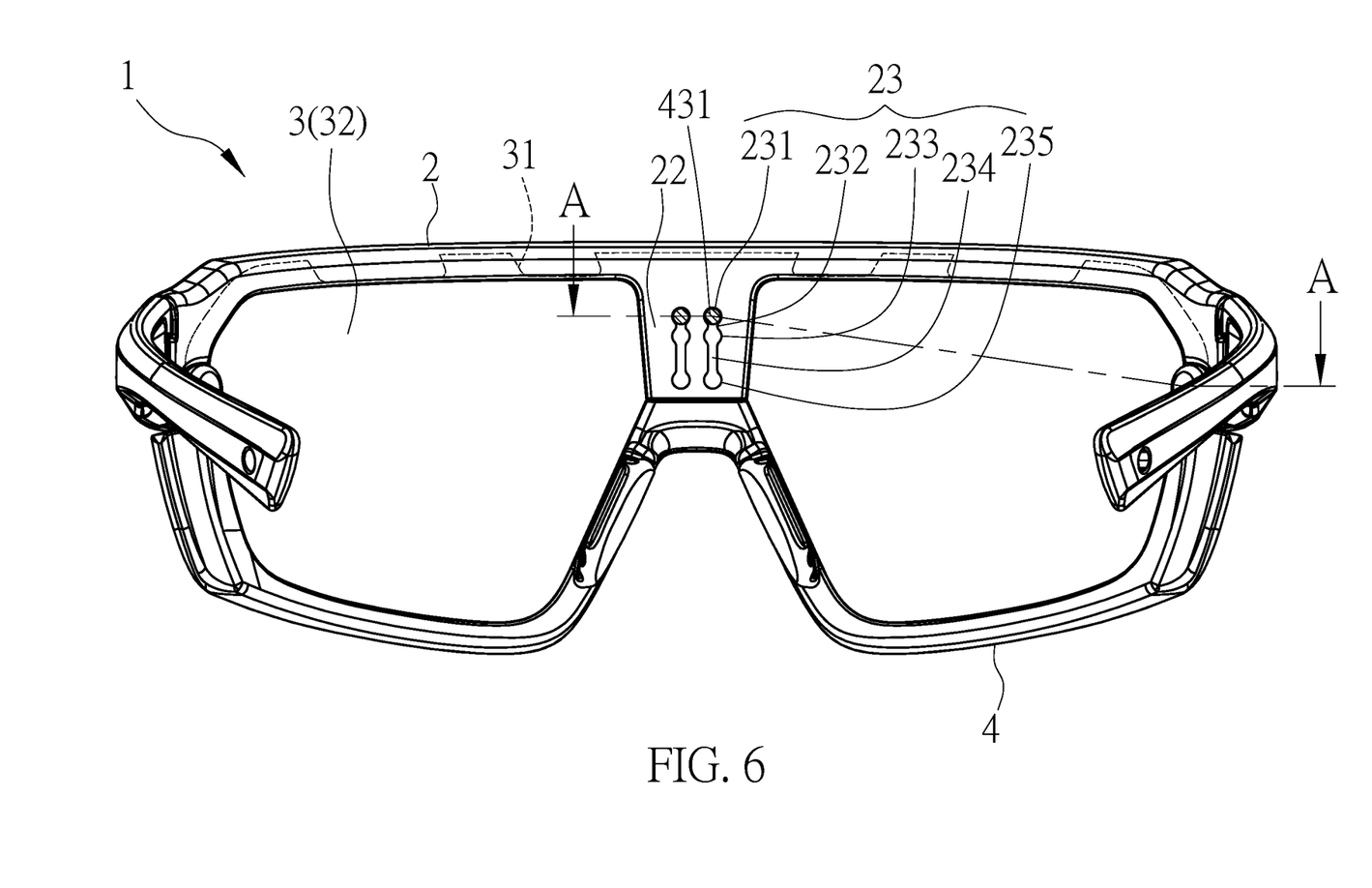
FIG. 6 is a rear view of the present disclosure.
Figure 7:
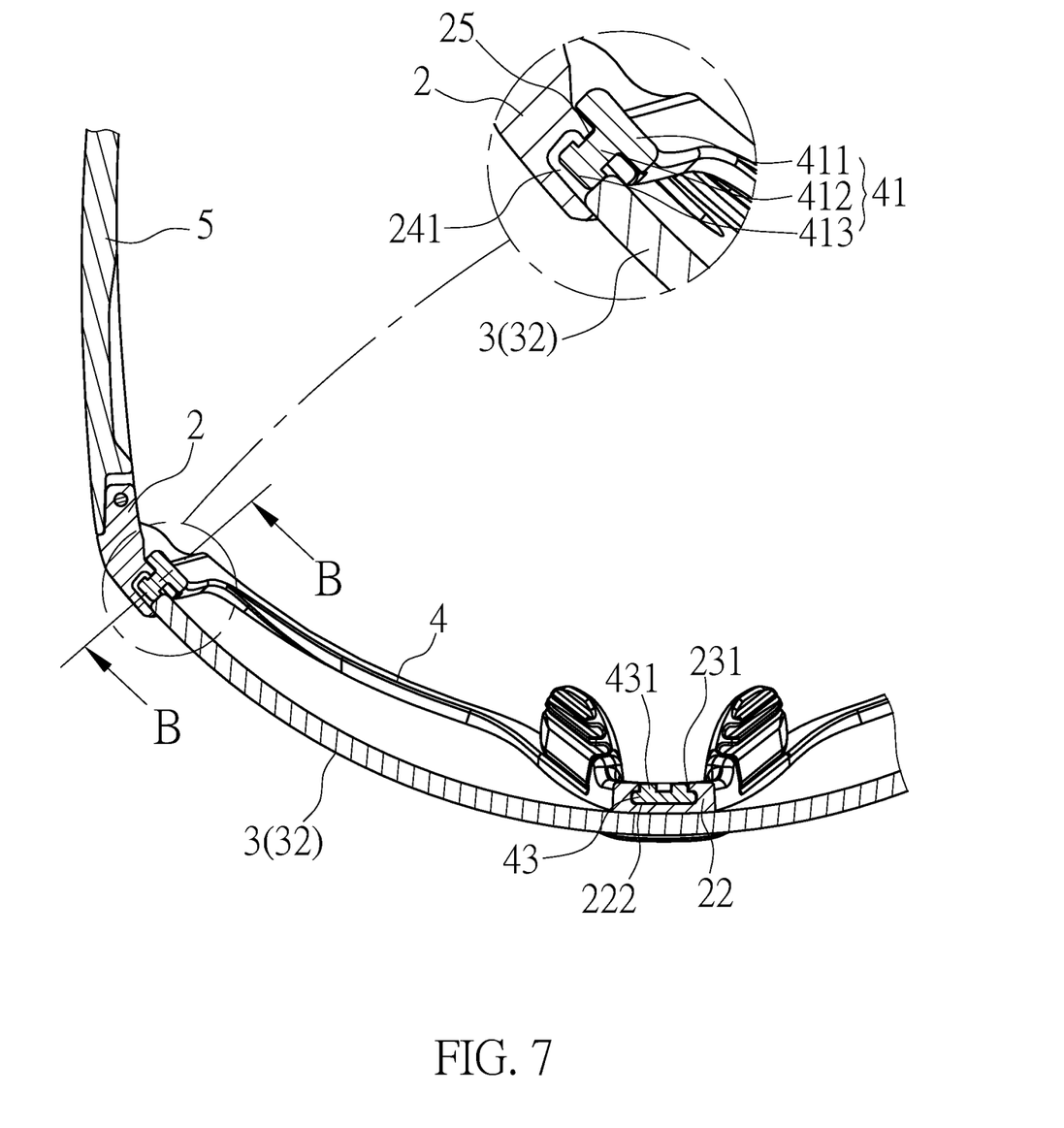
FIG. 7 shows a cross-sectional schematic diagram taken along the line A-A in FIG. 6 according to the embodiment of the present disclosure.
Figure 8:
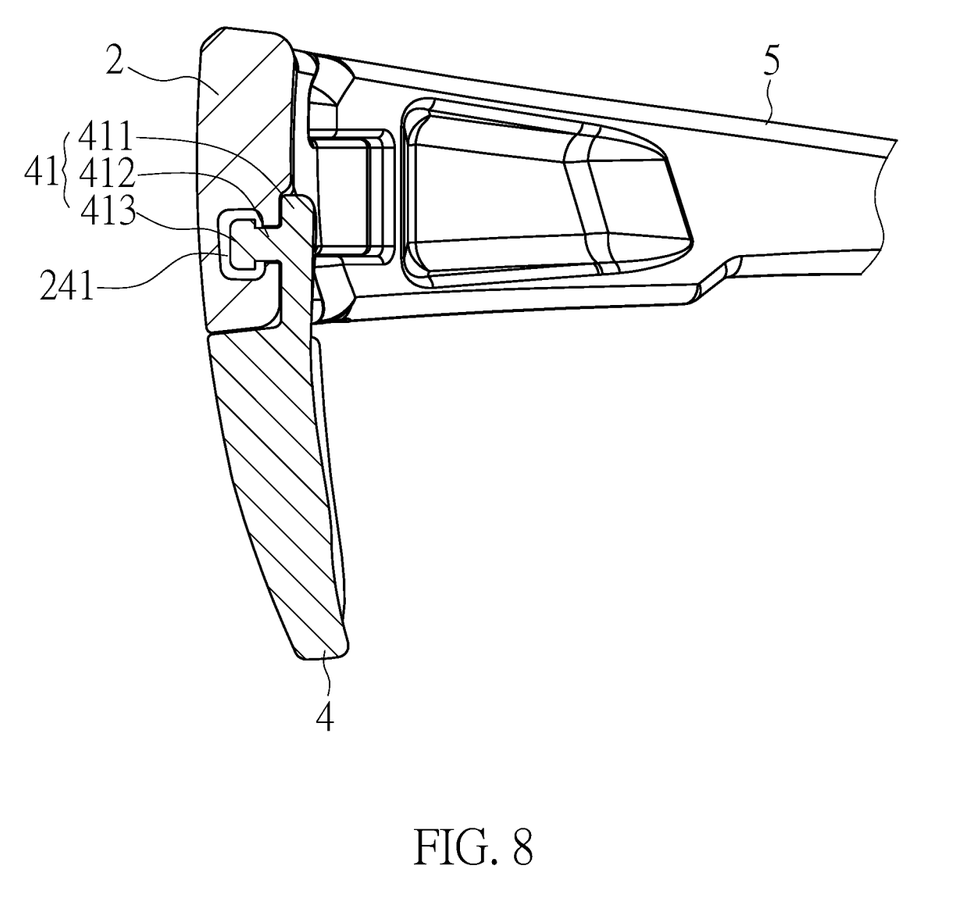
FIG. 8 shows a cross-sectional schematic diagram taken along the line B-B in FIG. 7 according to the embodiment of the present disclosure.

Each of the sides of the lower frame 4 is provided with a joint section 41. The joint section 41 includes an operating section 411 extending upward from the rear side of the lower frame 4, a cylinder 412 extending from the operating section 411 toward the front side of the lower frame 4, and a head 413 provided at the front end of the cylinder 412. As shown in FIGS. 6-8, the diameter D2 of the cylinder 412 and the diameter D3 of the head 413 are greater than the width of the opening 251 of the combination hole 25. The cylinder 412 of the joint section 41 is elastically forced into the opening 251 by its material, and is restricted in the combination hole 25 such that the head 413 is accommodated in the accommodating space 241. The diameter D3 of the head 413 is greater than the diameter D1 of the combination hole 25 so that the joint section 41 is prevented from detaching from the rear side of the lower frame 4. Consequently, the two sides of the lower frame 4 can be operatively combined or disassembled relative to the upper frame 2.

Moreover, the lower frame 4 is provided with a second lens groove 42. The lower end of the lens unit 3 is connected to the second lens groove 42, and the lens unit 3 is sealed with the accommodating space 241 of the upper frame 2 with its periphery to restrict the displacement of the head 413 of the joint section 41. The lower frame 4 is further provided with an inserting section 43 embedded in the inserting groove 222 between the joint sections 41. In the embodiment of the present disclosure, the inserting section 43 extends upward from the lower frame 4, and is located behind the second lens groove 42. The inserting section 43 is provided with at least one positioning convex part 431 facing the rear side of the lower frame 4. According to the embodiment of the present closure, the adjusting unit 23 is provided with two positioning convex parts 431. The positioning convex part 431 is operatively embedded in the first adjusting hole 231, the second adjusting hole 233 or the third adjusting hole 235 of the adjusting unit 23 to from a positioning.

As shown in FIG. 6, when the positioning convex part 431 of the lower frame 4 is embedded in the first adjusting hole 231, the plurality of air-permeable holes 31 of the lens unit 3 are received in the first lens groove 24 and are shielded by the upper frame 2.

Figure 9:
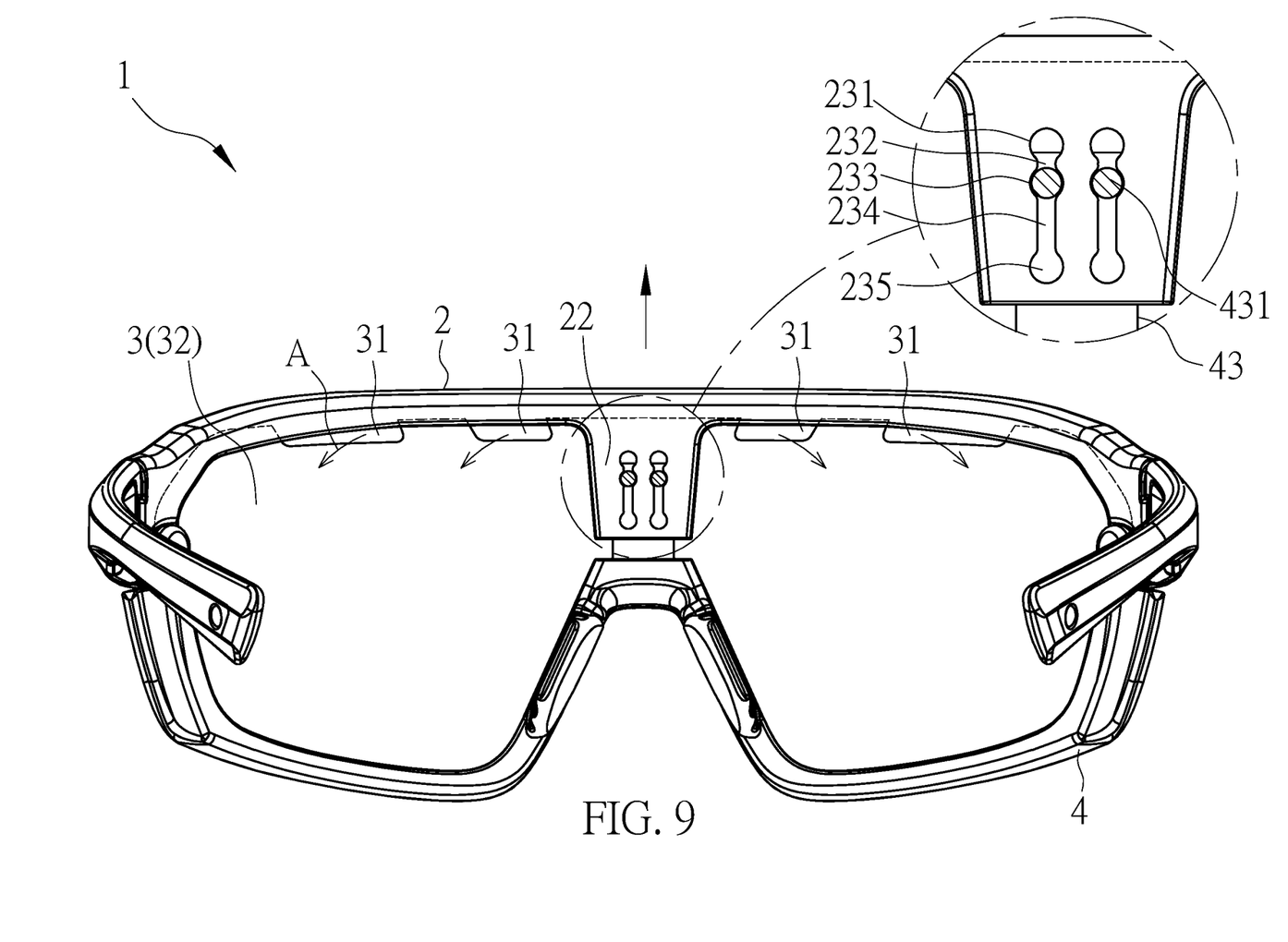
FIG. 9 is a schematic diagram of the operation of the present disclosure.

Please refer to FIG. 9, when the wearer's sweat or heat causes mist on the rear side of the glasses, the middle section of the upper frame 2 can be forced upward or the lower frame 4 can be forced downward. Alternatively, the upper frame 2 and the lower frame 4 can be forced to each other in opposite directions at the same time such that the positioning convex part 431 of the inserting section 43 elastically passes through the first channel 232 according to its material, and is inserted into the second adjusting hole 233. Accordingly, the upper frame 2 is connected to the lower frame 4 on both sides. The middle section of the upper frame 2 is displaced upward relative to the lower frame 4 such that the plurality of air-permeable hole of the lens unit 3 is partially separated from the first lens groove 24, and exposed outside the upper frame 2. It is worth mentioning that the upper end of the lens unit 3 is still arranged in the first lens groove 24. As a result, the air A can enter through the plurality of air-permeable holes 231 at the upper end of the lens unit 3 so as to avoid the generation of mist.

Figure 10:
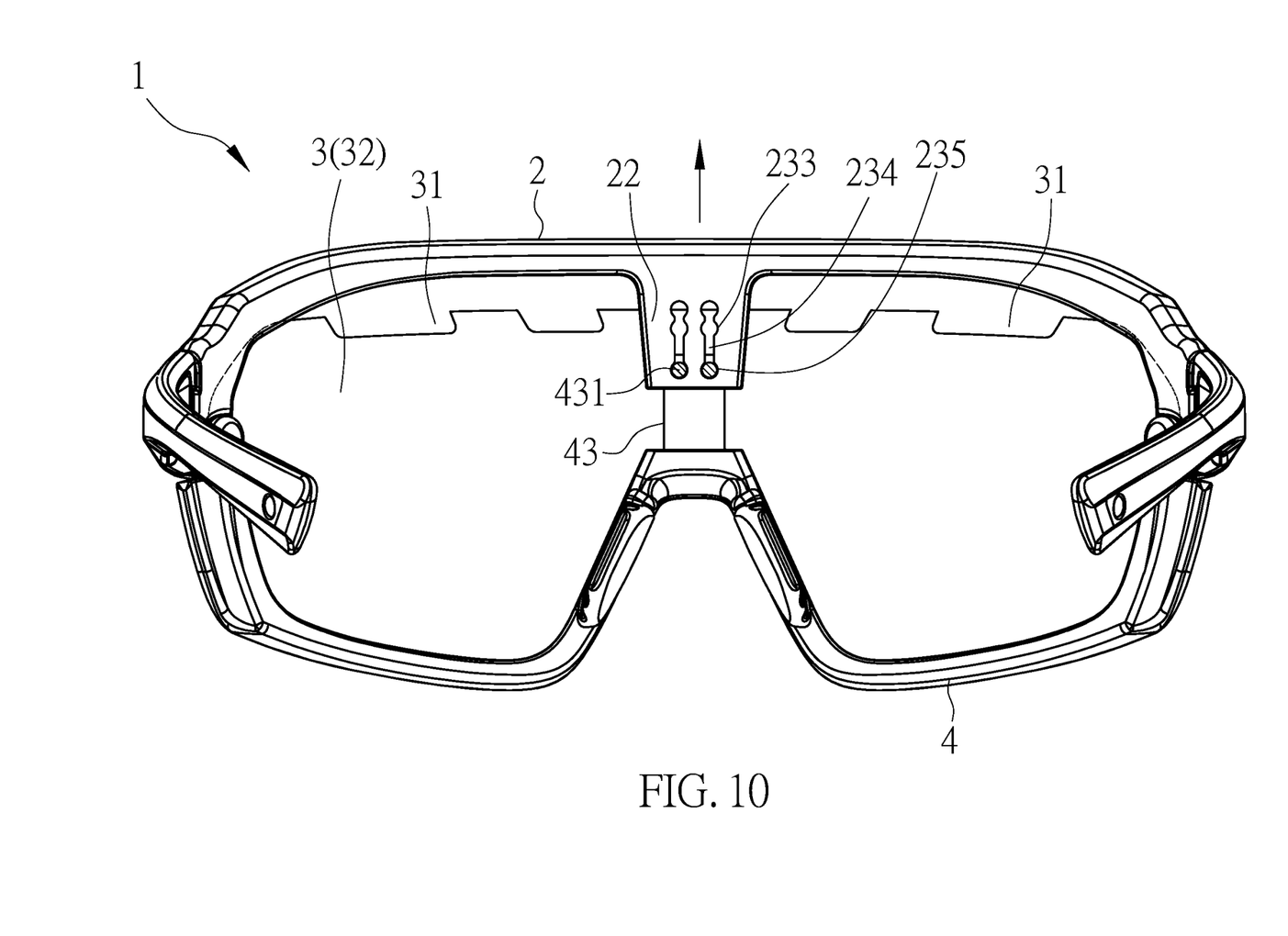
FIG. 10 is a schematic diagram of the operation of the present disclosure.

Further, further force is applied to the upper frame 2 or the lower frame 4, the positioning convex part 431 elastically passes through the second channel 234 with its material, and is inserted into the third adjusting hole 235, the upper end of the lens unit 3 will be separated from the first lens groove 24 of the upper frame 2, the wearer can take out the lens unit 3. After the lens unit 3 is taken out, the joint sections 41 on both sides of the lower frame 4 are operated to make the cylinder 412 elastically pass through the opening 251 with its material. Correspondingly, the lower frame 4 is disassembled and separated from the upper frame 2.

In summary, according to the present disclosure, the positioning convex part 431 of the inserting section 43 is operatively displaced on the adjusting unit 23 of the inserting seat 22 such that the upper frame 2 moves relative to the lower frame 4, thereby achieving the purpose of operably opening and closing the plurality of air-permeable holes. Additionally, the lower frame 4 can be operatively combined or disassembled on two sides of the upper frame 2 to facilitate the replacement of the lens unit 3.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A pair of glasses with a ventilated structure, with a side facing a wearer's face as a rear side and a side facing an outside as a front side, the pair of glasses comprising:

an upper frame, provided with a pivot seat on each of two sides thereof, wherein a inserting seat is provided between pivot seats, the inserting seat is provided with an inserting groove with a downward notch, one sidewall of the inserting seat is provided with an adjusting unit, the adjusting unit is at least provided with a first adjusting hole, a first channel and a second adjusting hole from top to bottom, the first adjusting hole, the first channel and the second adjusting hole are connected to each other, and communicate with the inserting seat, a width of the first channel is smaller than widths of the first adjusting hole and the second adjusting hole, and the upper frame further comprises a first lens groove and a combination hole with an opening adjacent to the pivot seat to communicate with the first lens groove;

a lens unit, wherein an upper end of the lens unit is connected to the first lens groove of the upper frame, and is provided with a plurality of spaced air-permeable holes; and a lower frame, provided with a joint section on each of two sides thereof, wherein the joint section enters the combination hole through the opening, and is coupled with the combination hole such that the two sides of the lower frame are operatively coupled or disassembled with respect to the upper frame, the lower frame includes an inserting section between joint sections to be embedded in the inserting groove, and the inserting section is further provided with a positioning convex part operatively embedded in the first adjusting hole or the second adjusting hole of the adjusting unit to form a positioning, wherein when the positioning convex part of the lower frame is embedded in the first adjusting hole, the plurality of air-permeable holes of the lens unit are received in the first lens groove and are shielded by the upper frame; when the positioning convex part of the inserting section elastically passes through the first channel with its material elasticity, and is inserted into the second adjusting hole, the combination hole of the upper frame is rotated relative to the lower frame such that the plurality of air-permeable holes of the lens unit are partially exposed outside the upper frame, and wherein the first lens groove is provided with an accommodating space corresponding to the combination hole, each of the joint sections includes an operating section extending upward from the lower frame, a cylinder provided on the operating section, and a head provided at the front end of the cylinder, the diameter of the cylinder and the diameter of the head are larger than a width of the opening of the combination hole, the opening extends from the combination hole to the periphery of the upper frame, and the cylinder is elastically forced into the opening with its material such that the head is accommodated in the accommodating space.

2. The pair of glasses with a ventilated structure of claim 1, wherein the adjusting unit further comprises a third adjusting hole and a second channel connected between the second adjusting hole and the third adjusting hole, the third adjusting hole and the second channel are connected to the inserting groove, and a width of the second channel is smaller than widths of the second adjusting hole and the third adjusting hole.

3. The pair of glasses with a ventilated structure of claim 1, wherein the first adjusting hole, the second adjusting hole and the first channel of the adjusting unit as well as the positioning convex part of the lower frame are directed toward the rear side of the upper frame.

4. The pair of glasses with a ventilated structure of claim 1, wherein the lower frame is provided with a second lens groove, and a lower end of the lens unit is combined with the second lens groove.

5. The pair of glasses with a ventilated structure of claim 1, wherein the lens unit is a one-piece lens.

6. The pair of glasses with a ventilated structure of claim 1, wherein the lens unit is a two-piece lens.

7. The pair of glasses with a ventilated structure of claim 1, further comprising two temples, respectively pivotally connected to the pivot seats of the upper frame.

* * * * *